(12) United States Patent
Gao et al.

(10) Patent No.: US 12,169,953 B2
(45) Date of Patent: Dec. 17, 2024

(54) PREDICTIVE TREE-BASED GEOMETRY CODING FOR A POINT CLOUD

(71) Applicant: TENCENT AMERICA LLC, Palo Alto, CA (US)

(72) Inventors: Wen Gao, Palo Alto, CA (US); Xiang Zhang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/432,973

(22) Filed: Feb. 5, 2024

(65) Prior Publication Data

US 2024/0177356 A1    May 30, 2024

Related U.S. Application Data

(63) Continuation of application No. 17/324,627, filed on May 19, 2021, now Pat. No. 11,941,856.

(60) Provisional application No. 63/067,286, filed on Aug. 18, 2020.

(51) Int. Cl.
   *G06T 9/40*    (2006.01)
   *G06T 9/00*    (2006.01)
   *G06T 17/20*   (2006.01)

(52) U.S. Cl.
   CPC ............... *G06T 9/40* (2013.01); *G06T 9/001* (2013.01); *G06T 17/205* (2013.01)

(58) Field of Classification Search
   None
   See application file for complete search history.

(56) References Cited

U.S. PATENT DOCUMENTS

| | | | | |
|---|---|---|---|---|
| 11,212,558 B2 * | 12/2021 | Sugio | .................... | H04N 19/152 |
| 11,514,611 B2 * | 11/2022 | Mammou | ................. | G06T 9/00 |
| 11,533,494 B2 * | 12/2022 | Mammou | .............. | H04N 19/20 |
| 11,606,551 B2 * | 3/2023 | Sugio | ........................ | G06T 9/40 |
| 11,625,865 B2 * | 4/2023 | Wang | ..................... | G06T 9/005 |
| | | | | 382/238 |
| 11,647,226 B2 * | 5/2023 | Kim | ..................... | H04N 19/597 |
| | | | | 375/240.12 |
| 11,663,744 B2 * | 5/2023 | Tourapis | ................. | G06T 17/20 |
| | | | | 382/232 |

(Continued)

FOREIGN PATENT DOCUMENTS

| | | | |
|---|---|---|---|
| CN | 111095929 A | | 5/2020 |
| KR | 10-2020-0039757 A | | 4/2020 |

(Continued)

OTHER PUBLICATIONS

Office Action issued Jul. 24, 2023 in Japanese Application No. 2022-529904.

(Continued)

*Primary Examiner* — Anand P Bhatnagar
(74) *Attorney, Agent, or Firm* — Sughrue Mion, PLLC

(57) ABSTRACT

A method, computer program, and computer system is provided for decoding point cloud data. Data corresponding to a point cloud is received. A number of contexts associated with the received data is reduced based on reducing a size of an array corresponding to syntax elements for predictive tree-based coding of the point cloud. The data corresponding to the point cloud is decoded based on the reduced number of contexts.

20 Claims, 10 Drawing Sheets

(56) References Cited

U.S. PATENT DOCUMENTS

| | | | |
|---|---|---|---|
| 11,935,272 B2 | 6/2024 | Mammou et al. | |
| 2005/0007497 A1 | 1/2005 | Huang et al. | |
| 2014/0161188 A1 | 6/2014 | Zhang et al. | |
| 2017/0366818 A1 | 12/2017 | Zhang et al. | |
| 2018/0376151 A1* | 12/2018 | Begaint | G06T 3/14 |
| 2019/0156519 A1 | 5/2019 | Mammou et al. | |
| 2020/0153885 A1 | 5/2020 | Lee et al. | |
| 2021/0127136 A1 | 4/2021 | Han et al. | |
| 2022/0232234 A1* | 7/2022 | Zakharchenko | H04N 19/146 |
| 2023/0105931 A1* | 4/2023 | Van der Auwera | H04N 19/597 382/232 |
| 2023/0141458 A1* | 5/2023 | Wang | H04N 19/136 375/240.12 |

FOREIGN PATENT DOCUMENTS

| | | | | |
|---|---|---|---|---|
| WO | 2019/055772 A1 | | 3/2019 | |
| WO | 2019/195922 A1 | | 10/2019 | |
| WO | WO-2019195920 A1 | * | 10/2019 | G06T 3/40 |
| WO | 2020/013249 A1 | | 1/2020 | |

OTHER PUBLICATIONS

"Information technology—MPEG-I (Coded Representation of Immersive Media)—Part 9: Geometry-based Point Cloud Compression", ISO/IEC 23090-9:2020(E), ISO/IEC JTC 1/SC 29/WG 11, 2020, 155 pgs.

3DG, "G-PCC codec description v5", ISO/IEC JTC 1/SC 29/WG 11 Coding of moving pictures and audio, N18891, Dec. 13, 2019, 74 pgs.

Christian Tulvan et al., "Use Cases for Point Cloud Compression (PCC)", ISO/IEC JTC1/SC29/WG11 MPEG2015/ N1633, Jun. 2016, 8 pgs., Geneva, CH.

Rufael Mekuria et al., "Requirements for Point Cloud Compression", ISO/IEC JTC1/SC29/WG11 MPEG2016/n16330, Feb. 2016, 3 pgs., Geneva, CH.

Stefan Gumhold et al., "Predictive Point-Cloud Compression", 1 pg.

Extended European Search Report dated Dec. 13, 2022, in European Application No. 21858757.4.

Flynn et al., "G-PCC: Suggestions related to predictive geometry coding", ISO/IEC JTC 1/SC 29/WG 11 Coding of Moving Pictures and Audio, M55492, Oct. 12, 2020, 2 pgs.

Keng Liang Loi et al., "[G-PCC] [EE13.8 Related] Predictive tree encoding modifications", ISO/IEC JTC 1/SC 29/WG 11 Coding of moving pictures and audio, M53538, Apr. 15, 2020, 11 pgs.

Written Opinion of the International Searching Authority dated Sep. 9, 2021, in International Application No. PCT/US2136144.

International Search Report dated Sep. 9, 2021 in International Application No. PCT/US21/36144.

Loi Keng Liang, et al., "[G-PCC] CE13.39 report on Bit count coding for predictive coding", Jun. 2020, Panasonic corporation, ISO/IEC JTC1/SC29/WG11 MPEG2020/m54628 (4 pages).

Korean Office Action dated Aug. 22, 2024 in Application No. 10-2022-7009325.

* cited by examiner

| | Descriptor |
|---|---|
| geometry_predtree_node( nodeIdx ) { | |
| ... | |
| ptn_child_cnt[ nodeIdx ] | ae(v) |
| ptn_pred_mode[ nodeIdx ] | ae(v) |
| ... | |
| for( k = 0; k < 3; k++ ) { | |
| ptn_residual_eq0_flag[ k ] | ae(v) |
| if( !ptn_residual_eq0_flag[ k ] ) { | |
| ptn_residual_sign_flag[ k ] | ae(v) |
| ptn_residual_abs_log2[ k ] | ae(v) |
| ptn_residual_abs_remaining[ k ] | ae(v) |
| } | |
| } | |
| for( i = 0; i < ptn_child_cnt; i++ ) | |
| geometry_predtree_node( ++PtnNodeIdx ) | |
| } | |

FIG. 3

PREDICTIVE TREE-BASED GEOMETRY CODING FOR A POINT CLOUD

CROSS REFERENCE TO RELATED APPLICATIONS

This application is a Continuation application of U.S. application Ser. No. 17/324,627 filed May 19, 2021, which claims priority based on U.S. Provisional Application No. 63/067,286 (filed Aug. 18, 2020), the entirety of which is incorporated by reference herein.

BACKGROUND

This disclosure relates generally to field of data processing, and more particularly to point clouds.

Point Cloud has been widely used in recent years. For example, it is used in autonomous driving vehicles for object detection and localization; it is also used in geographic information systems (GIS) for mapping, and used in cultural heritage to visualize and archive cultural heritage objects and collections, etc. Point clouds contain a set of high dimensional points, typically of three dimensional (3D), each including 3D position information and additional attributes such as color, reflectance, etc. They can be captured using multiple cameras and depth sensors, or Lidar in various setups, and may be made up of thousands up to billions of points to realistically represent the original scenes. Compression technologies are needed to reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic point clouds.

SUMMARY

Embodiments relate to a method, system, and computer readable medium for decoding point cloud data. According to one aspect, a method for decoding point cloud data is provided. The method may include receiving data corresponding to a point cloud. A number of contexts associated with the received data is reduced based on reducing a size of an array corresponding to syntax elements for predictive tree-based coding of the point cloud. The data corresponding to the point cloud is decoded based on the reduced number of contexts.

According to another aspect, a computer system for decoding point cloud data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving data corresponding to a point cloud. A number of contexts associated with the received data is reduced based on reducing a size of an array corresponding to syntax elements for predictive tree-based coding of the point cloud. The data corresponding to the point cloud is decoded based on the reduced number of contexts.

According to yet another aspect, a computer readable medium for decoding point cloud data is provided. The computer readable medium may include one or more computer-readable storage devices and program instructions stored on at least one of the one or more tangible storage devices, the program instructions executable by a processor. The program instructions are executable by a processor for performing a method that may accordingly include receiving data corresponding to a point cloud. A number of contexts associated with the received data is reduced based on reducing a size of an array corresponding to syntax elements for predictive tree-based coding of the point cloud. The data corresponding to the point cloud is decoded based on the reduced number of contexts.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 3 is a syntax element for point cloud coding, according to at least one embodiment;

DETAILED DESCRIPTION

Figure 1:
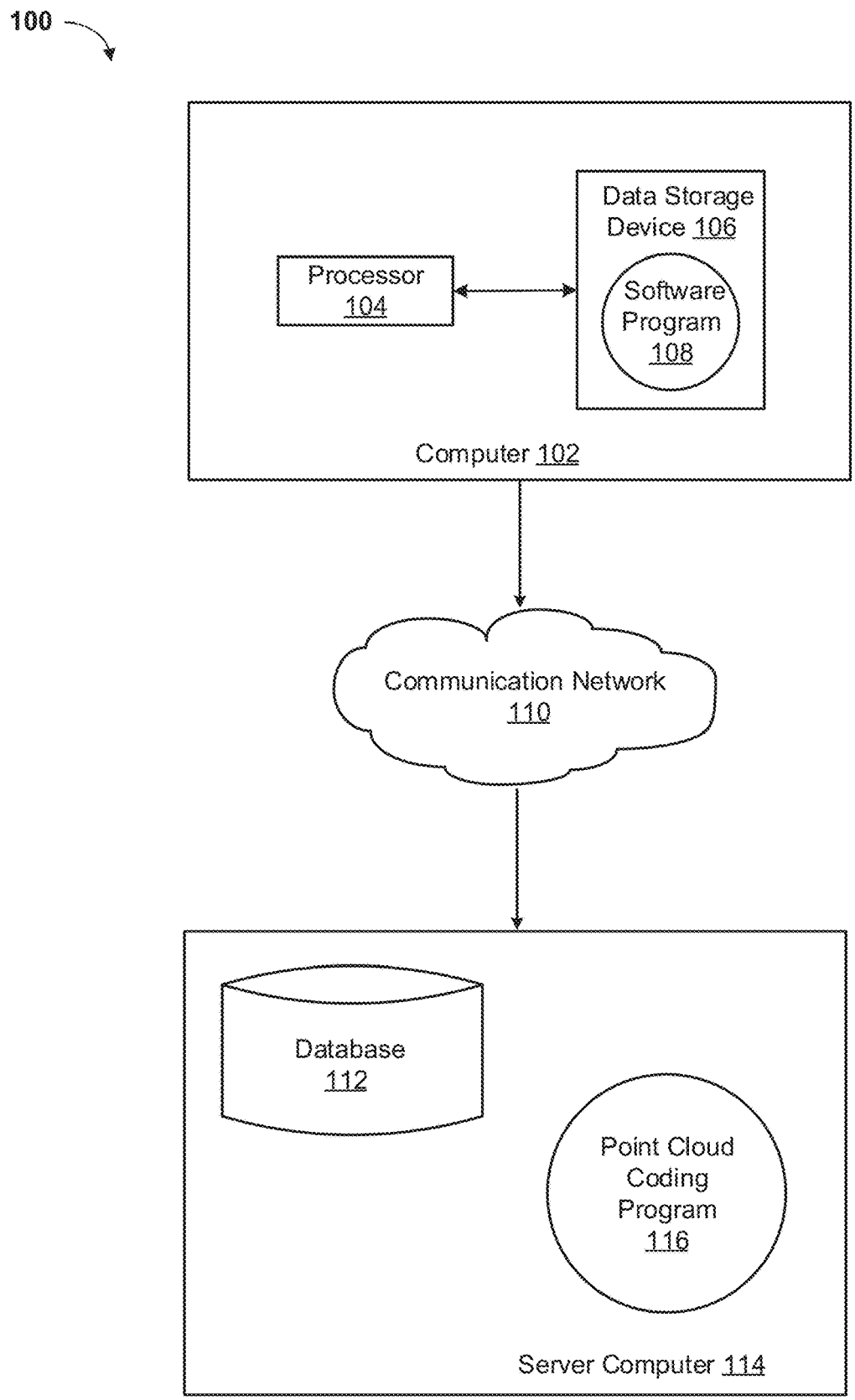
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to point clouds. The following described exemplary embodiments provide a system, method and computer program to, among other things, reduce contexts for point cloud coding based on reducing a size of an array corresponding to syntax elements for predictive tree-based coding of the point cloud. Therefore, some embodiments have the capacity to improve the field of computing by allowing for improved point cloud compression and decompression based on the reduced number of contexts.

As previously described, point cloud coding has been widely used in recent years. For example, it is used in autonomous driving vehicles for object detection and localization; it is also used in geographic information systems (GIS) for mapping, and used in cultural heritage to visualize and archive cultural heritage objects and collections, etc. Point clouds contain a set of high dimensional points, typically of three dimensional (3D), each including 3D position information and additional attributes such as color, reflectance, etc. They can be captured using multiple cameras and depth sensors, or Lidar in various setups, and may be made up of thousands up to billions of points to realistically represent the original scenes. Compression technologies are needed to reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic point clouds.

In the MPEG TMC13 model, geometry information and associated attributes, such as color or reflectance, are separately compressed. The geometry information, which is the 3D coordinates of the point clouds, is coded by octree-partition, quadtree-partition and binary partition with its occupancy information. After geometry information is coded, the attributes are then compressed based on reconstructed geometry using prediction, lifting and region adaptive hierarchical transform techniques. For geometry coding, there are two approaches, one is octree-based approach, another is predictive-tree-based approach. However, predictive tree coding, as defined in MPEG-PCC, requires a lot of contexts to code ptn_residual_abs_log2[k], k=0, 1, 2 syntax elements, which is rather expensive. It may be advantageous, therefore, to reduce the number of contexts without significant performance loss. In addition, predictive tree-based coding may be combined with node-based coding to offer further performance gains.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program for point cloud coding using a reduced number of contexts. Referring now to FIG. 1, a functional block diagram of a networked computer environment illustrating a point cloud coding system 100 (hereinafter "system") for compressing and decompressing point cloud data. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 5 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for point cloud coding is enabled to run a Point Cloud Coding Program 116 (hereinafter "program") that may interact with a database 112. The Point Cloud Coding Program method is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger point cloud coding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2A:
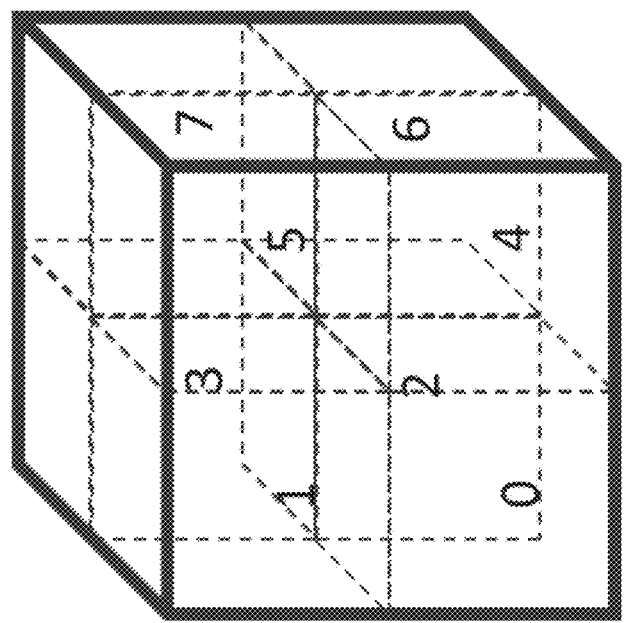
FIG. 2A is a diagram of an octree structure for point cloud data, according to at least one embodiment.

Referring now to FIG. 2A, a diagram of an octree structure 200A is depicted. In TMC13, if the octree geometry codec is used, the geometry encoding proceeds as follows. First, a cubical axis-aligned bounding box B is defined by two points (0,0,0) and $(2^{M-1}, 2^{M-1}, 2^{M-1})$ where $2^{M-1}$ defines the size of B and M is specified in the bitstream. The octree structure 200A is then built by recursively subdividing B. At each stage, a cube is subdivided into 8 sub-cubes. An 8-bit code, namely the occupancy code, is then generated by associating a 1-bit value with each sub-cube in order to indicate whether it contains points (i.e., full and has value 1) or not (i.e., empty and has value 0). Only full sub-cubes with a size greater than 1 (i.e., non-voxels) are further subdivided.

Figure 2B:
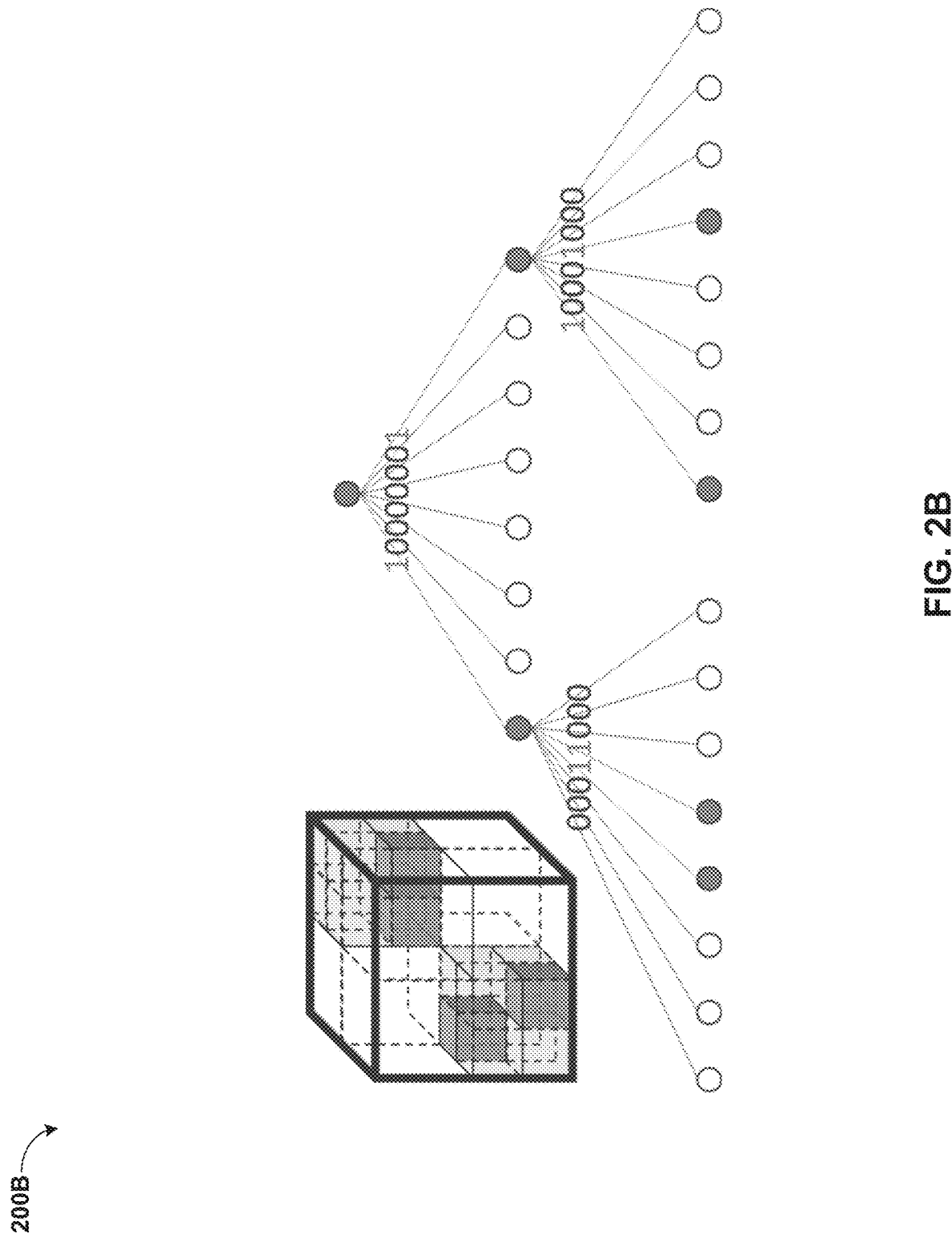
FIG. 2B is a diagram of an octree partition for point cloud data, according to at least one embodiment.

Referring now to FIG. 2B, a diagram of an octree partition 200B is depicted. The octree partition 200B may include a two-level octree partition 202 and a corresponding occupancy code 204, where cubes and nodes in dark indicate they are occupied by points. The occupancy code 204 of each node is then compressed by an arithmetic encoder. The occupancy code 204 can be denoted as S which is an 8-bit integer, and each bit in S indicates the occupancy status of each child node. Two encoding methods for occupancy code 204 exist in TMC13, i.e., the bit-wise encoding and the byte-wise encoding methods, and the bit-wise encoding is enabled by default. Either way performs arithmetic coding with context modeling to encode the occupancy code 204, where the context status is initialized at the beginning of the whole coding process and is updated during the coding process.

For bit-wise encoding, eight bins in S are encoded in a certain order where each bin is encoded by referring to the occupancy status of neighboring nodes and child nodes of neighboring nodes, where the neighboring nodes are in the same level of current node. For byte-wise encoding, S is encoded by referring to an adaptive look up table (A-LUT), which keeps track of the N (e.g., 32) most frequent occupancy codes and a cache which keeps track of the last different observed M (e.g., 16) occupancy codes.

A binary flag indicating whether S is the A-LUT or not is encoded. If S is in the A-LUT, the index in the A-LUT is encoded by using a binary arithmetic encoder. If S is not in the A-LUT, then a binary flag indicating whether S is in the cache or not is encoded. If S is in the cache, then the binary representation of its index is encoded by using a binary arithmetic encoder. Otherwise, if S is not in the cache, then the binary representation of S is encoded by using a binary arithmetic encoder. The decoding process starts by parsing the dimensions of the bounding box B from bitstream. The same octree structure is then built by subdividing B according to the decoded occupancy codes.

An occupancy code of current node typically has 8 bits, where each bit represents whether its $i^{th}$ child node is occupied or not. When coding the occupancy code of the current node, all the information from neighboring coded nodes can be used for context modeling. The context information can be further grouped in terms of the partition level and distance to current node. Without loss of generality, the context index of the $i^{th}$ child node in current node can be obtained as follows, $$idx=LUT[i][ctxIdxParent][ctxIdxChild],$$

where LUT is a look-up table of context indices. ctxIdxParent and ctxIdxChild denote the LUT indices representing the parent-node-level and child-node-level neighboring information.

Figure 2C:
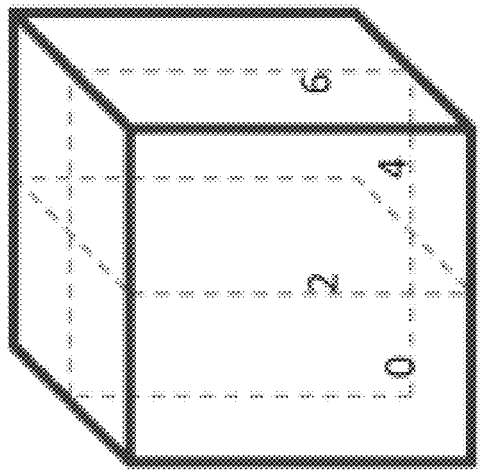
FIG. 2C is a diagram of quad-tree partitioning, according to at least one embodiment.
Figure 2C:
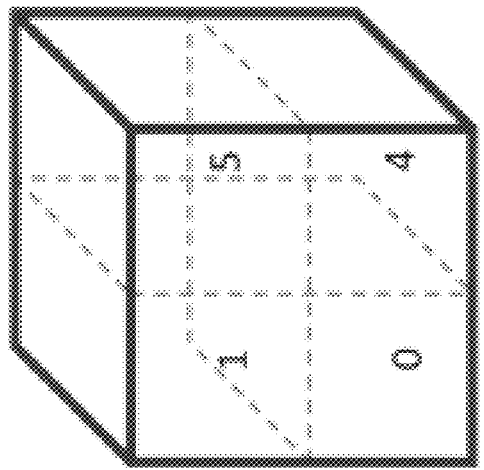
Figure 2C:
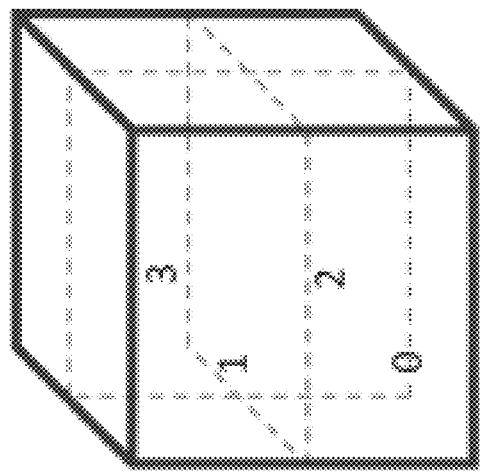

Referring now to FIG. 2C, a diagram 200C of quad-tree partitioning is depicted. For a point cloud, its bounding box B is not restricted to be with same size in all directions, instead it can be arbitrary-size rectangular cuboid to better fit the shape of the 3D scene or objects. In implementation, the size of B is usually represented as a power of two, i.e., $(2^{d_x}, 2^{d_y}, 2^{d_z})$. Note that $d_x$, $d_y$, $d_z$ are not assumed to be equal. In quad-tree partition, two of the three dimensions (i.e., x, y, z dimension) are split in half, resulting in 4 sub-boxes with the same size. Diagram 200C shows quad-tree partitioning of a 3D cube along the x-y, x-z, y-z axes, respectively.

Figure 2D:
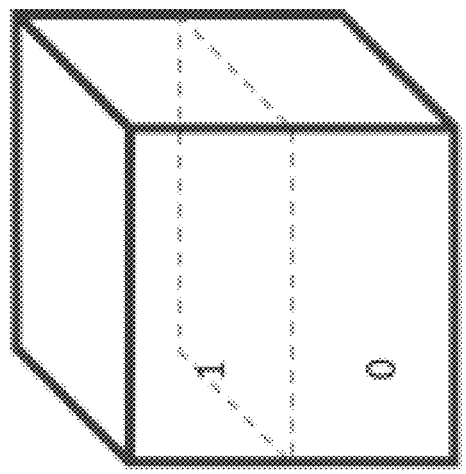
FIG. 2D is a diagram of binary-tree partitioning, according to at least one embodiment.
Figure 2D:
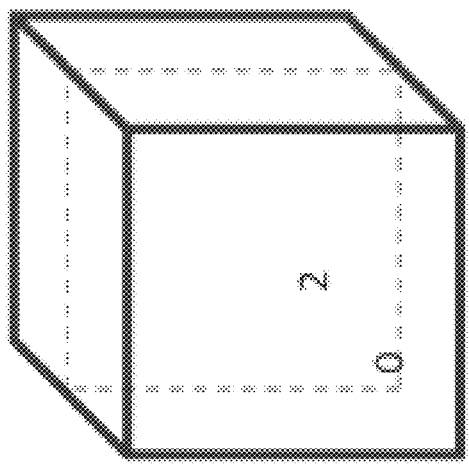
Figure 2D:
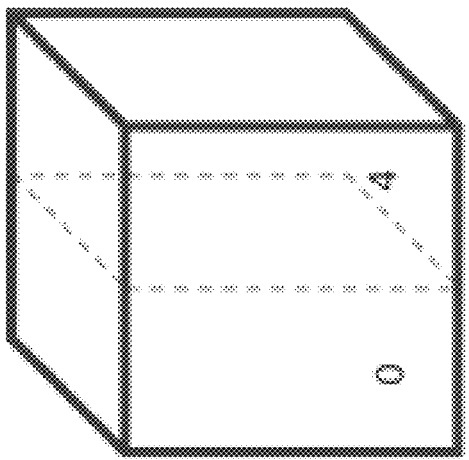

Referring now to FIG. 2D, a diagram 200D of binary-tree partitioning is depicted. As previously discussed, the bounding box B is not restricted to be with same size in all directions, instead it can be arbitrary-size rectangular cuboid to better fit the shape of the 3D scene or objects. In implementation, the size of B is usually represented as a power of two, i.e., $(2^{d_x}, 2^{d_y}, 2^{d_z})$. Note that $d_x$, $d_y$, $d_z$ are not assumed to be equal. In binary-tree partitioning, only one of the three dimension (i.e., x, y, z dimension) is split in half, resulting in 2 sub-boxes with the same size. Diagram 200D shows binary-tree partitioning of a 3D cube along the x, y, and z axes, respectively.

Referring now to FIG. 3, an syntax element 300 is depicted. Predictive tree-based geometry coding was introduced where a predictive tree (i.e., a spanning tree) over all the points in the point cloud is constructed. For prediction of a point, all ancestors can be used. For example, the position of a point can be predicted from the position of its parent point, or from the positions of its parent and its grandparent point.

According to one or more embodiments, the syntax element 300 may include the following parameters:

ptn_child_cnt[nodeIdx] is the number of direct child nodes of the current predictive tree node present in the geometry predictive tree.

ptn_pred_mode[nodeIdx] is a mode used to predict the position associated with the current node.

ptn_residual_eq0_flag[k], ptn_residual_sign_flag[k], ptn_residual_abs_log2[k], and ptn_residual_abs_remaining[k] together specify the first prediction residual of the k-th geometry position component. ptn_residual_eq0_flag[k] specifies whether the residual component is equal to zero. ptn_residual_sign_flag[k] equal to 1 indicates that the sign of the residual component is positive. ptn_residual_sign_flag[k] equal to 0 indicates that the sign of the residual component is negative.

When encoding residual bitcount, assume a 5-bit bitcount value $b_4b_3b_2b_1b_0$, a total of context array, denoted ctxNumBits[12][3][31], is used. The index to the first dimension (value of 12), is used to represent a different set of contexts that are related to the overall value of ptn_residual_abs_log2 [k]. The index to the middle dimension (value of 3) indicates the three components of ptn_residual_abs_log2[k], k=0, 1, 2. The index to the last dimension (value of 31), denoted as ctxIdx, is determined based on the value of ptn_residual_abs_log2[k]=$b_4b_3b_2b_1b_0$.

According to one or more embodiments, a first method to determine ctxIdx may include:

For $b_0$, ctxIdx=0
For $b_1$, ctxIdx=1+$b_0$
For $b_2$, ctxIdx=3+$b_1 b_0$
For $b_3$, ctxIdx=7+$b_2 b_1 b_0$
For $b_4$, ctxIdx=15+$b_3 b_2 b_1 b_0$ A second method to determine ctxId is to reverse the order of coded bits, which may include:

For $b_4$, ctxIdx=0
For $b_3$, ctxIdx=1+$b_4$
For $b_2$, ctxIdx=3+$b_5 b_4$
For $b_1$, ctxIdx=7+$b_4 b_2 b_1$
For $b_0$, ctxIdx=15+$b_4 b_3 b_2 b_1$ According to one or more embodiments, the total number of context required to encode the syntax elements ptn_residual_abs_log2[k], k=0, 1, 2 may be reduced. In one embodiment, all three components of ptn_residual_abs_log2[k], k=0, 1, 2 shared the same set of contexts, i.e., the context array ctxNumBits[12][3][31], simplified as ctxNumBits[12][1][31]. In another embodiment, the three components of ptn_residual_abs_log2[k], k=0, 1, 2 still have the different set of contexts. Instead, the context array ctxNumBits[12][3][31] may be reduced to the context array ctxNumBits[12][3][8].

For example, the derivation of ctxIdx may be modified as:

For $b_0$, ctxIdx=0
For $b_1$, ctxIdx=1+$b_0$
For $b_2$, ctxIdx=3+$b_1 b_0$
For $b_3$, ctxIdx=7
For $b_4$, ctxIdx=8

Additionally, the derivation of ctxIdx may also be modified as:

For $b_4$, ctxIdx=0
For $b_3$, ctxIdx=1+$b_4$
For $b_2$, ctxIdx=3+$b_5 b_4$
For $b_1$, ctxIdx=7
For $b_0$, ctxIdx=8

In one or more embodiments, the total number of context required is reduced to less than ⅓ of its original size, significantly reducing the complexity of the encoder. In one or more embodiments, the context array ctxNumBits[12][3][31] may be reduced to just ctxNumBits[1][3][31]. Thus context may be determined based on component number k=0, 1, 2 and the bit value of ptn_residual_abs_log2[k]=$b_4 b_3 b_2 b_1 b_0$.

In node-based geometry coding, the geometry of a point cloud may be encoded until depth k is reached, where k is specified by an encoder and transmitted in the bitstream. For each occupied node at depth k, which can be viewed as a sub-volume (or subtree) of the point cloud. For simplicity, a node at depth k may be described as a largest coding unit (LCU). When using predictive tree to code one LCU, the number of points in LCU may be encoded followed by regular predictive-tree based coding while treating one LCU as the whole point cloud. Different ways can be used to encode number of points in LCU. For example, a fixed number of bits N may be used to encode number of points in LCU where N can be signaled in high level syntax of bitstream such as sequence parameter set, geometry parameter set or slice header, etc. The actual number of bits required to represent number of points in LCU, denoted as n, may be determined, and a fixed number, i.e., s-bit, may be used to represent n. The s-bit may be coded as bypass coding or use one context for each of the s-bit with entropy coding. A number of points in LCU may then be coded using n-bit with bypass coding. Since each LCU may correspond to an intermediate node in an octree partition and each node has its own starting position, the starting posting may be used as a default value of a predictive tree based coding. The bounding box of the LCU may also be determined, and its smallest coordinate may be used as the default value of predictive tree based coding.

Figure 4:
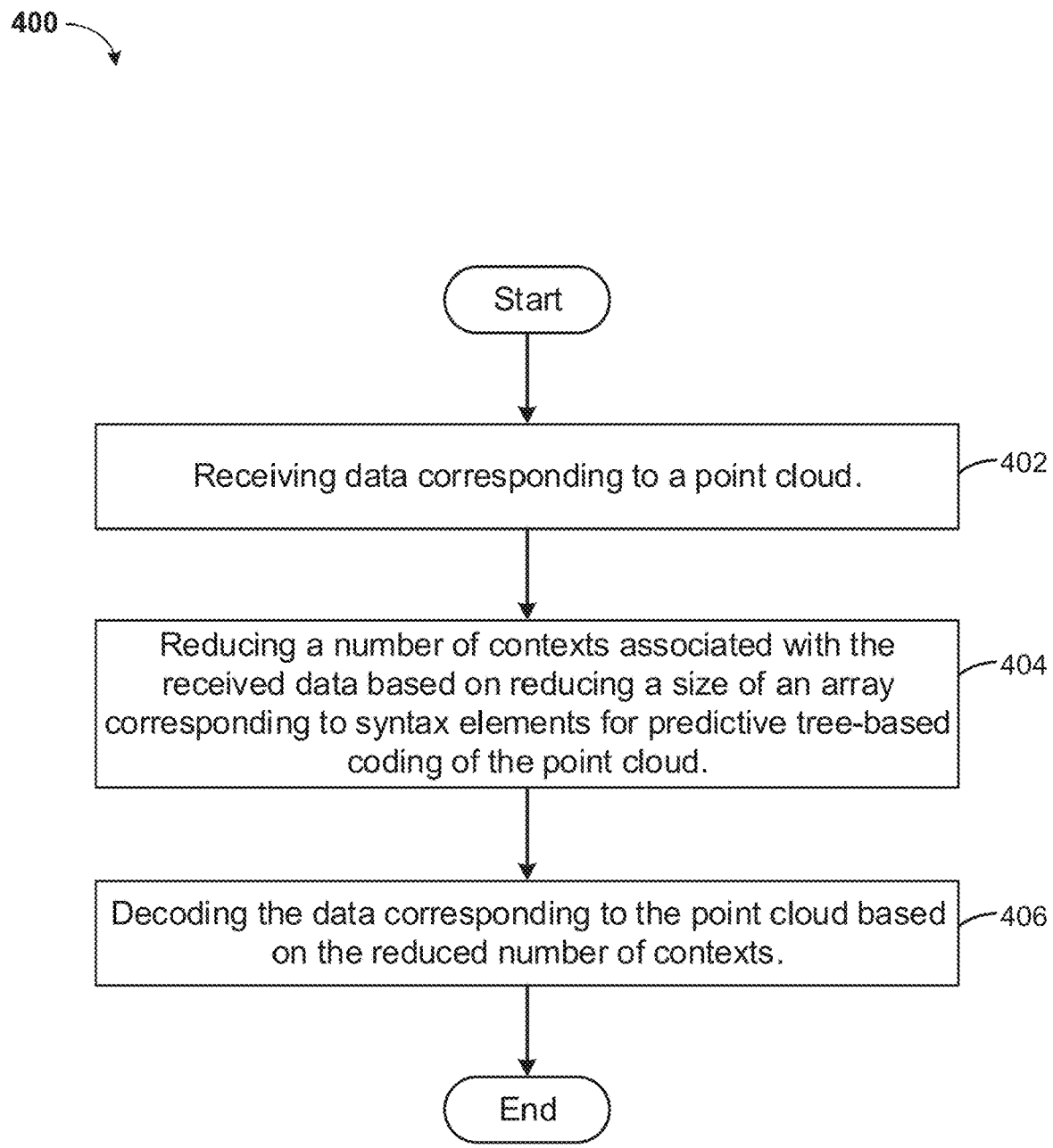
FIG. 4 is an operational flowchart illustrating the steps carried out by a program that decodes point cloud data, according to at least one embodiment.

Referring now to FIG. 4, an operational flowchart illustrating the steps of a method 400 carried out by a program that compresses and decompresses point cloud data is depicted.

At 402, the method 400 may include receiving data corresponding to a point cloud.

At 404, the method 400 may include reducing a number of contexts associated with the received data based on reducing a size of an array corresponding to syntax elements for predictive tree-based coding of the point cloud.

At 406, the method 400 may include decoding the data corresponding to the point cloud based on the reduced number of contexts.

It may be appreciated that FIG. 4 provides only an illustration of one implementation and does not imply any limitations with regard to how different embodiments may be implemented. Many modifications to the depicted environments may be made based on design and implementation requirements.

Figure 5:
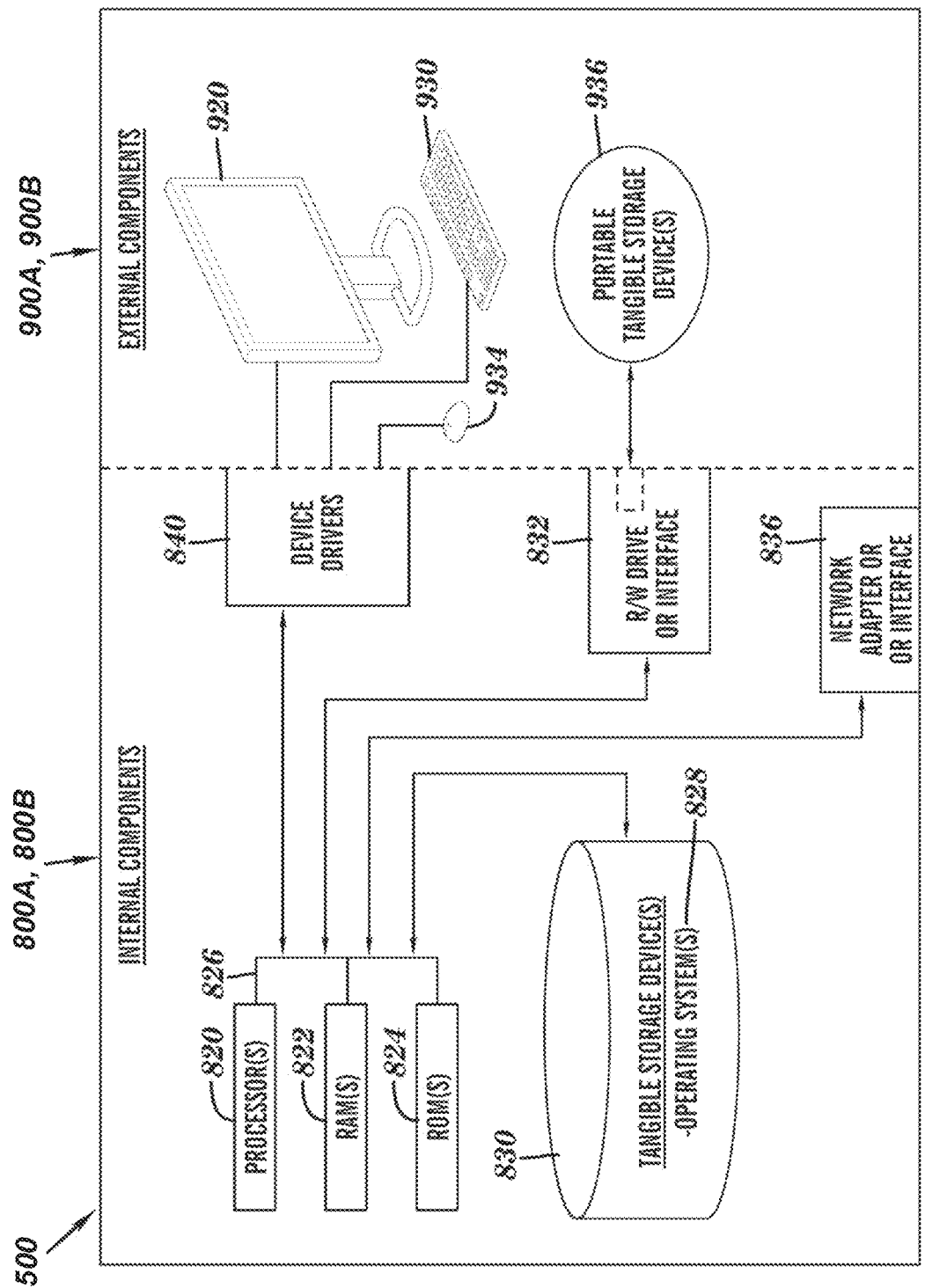
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Point Cloud Coding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Point Cloud Coding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Point Cloud Coding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Point Cloud Coding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations).

It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
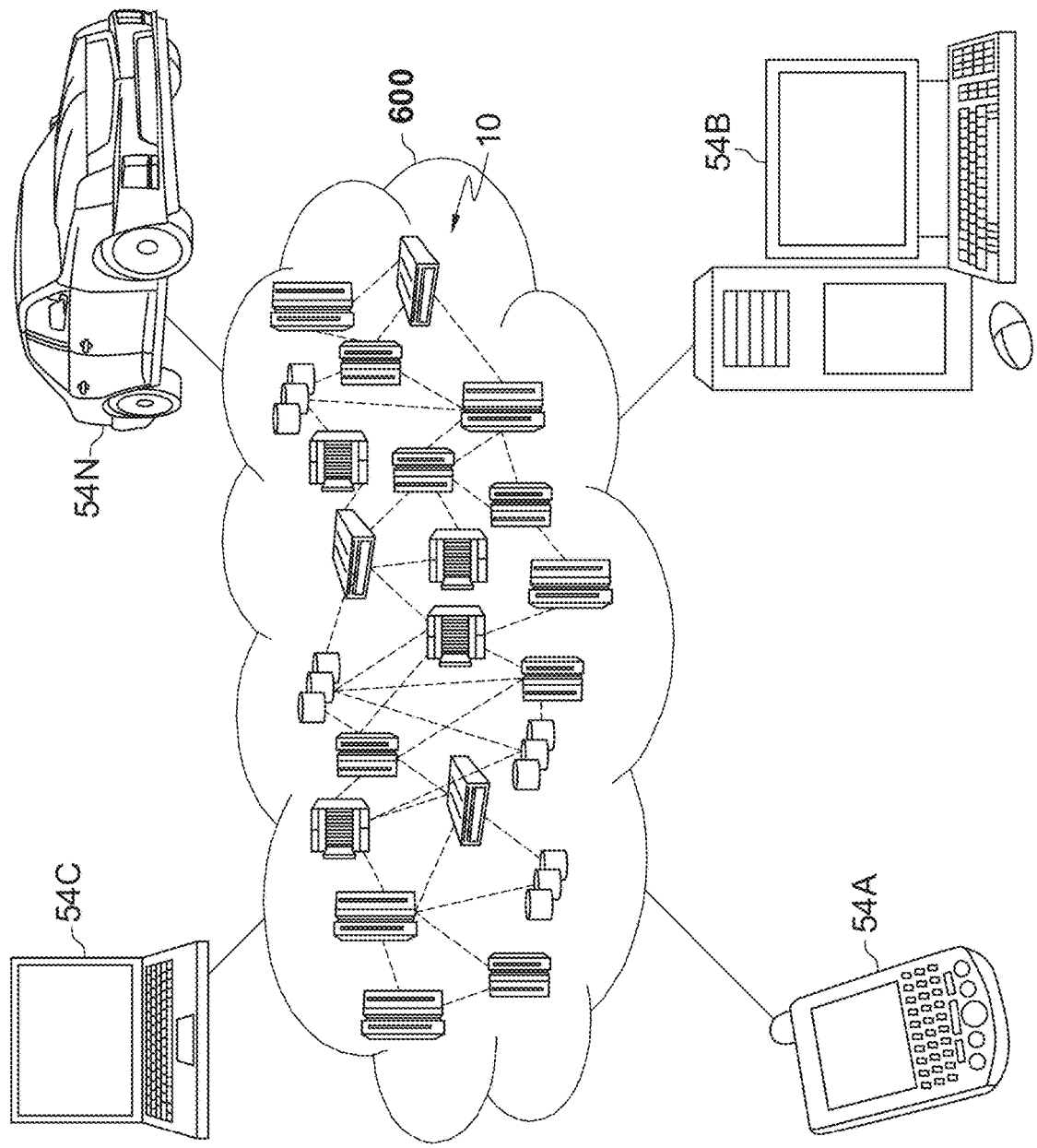
FIG. 6 is a block diagram of an illustrative cloud computing environment including the computer system depicted in FIG. 1, according to at least one embodiment.

Referring to FIG. 6, illustrative cloud computing environment 600 is depicted. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 600 can communicate with any type of computerized device over any type of network and/or network addressable connection (e.g., using a web browser).

Figure 7:
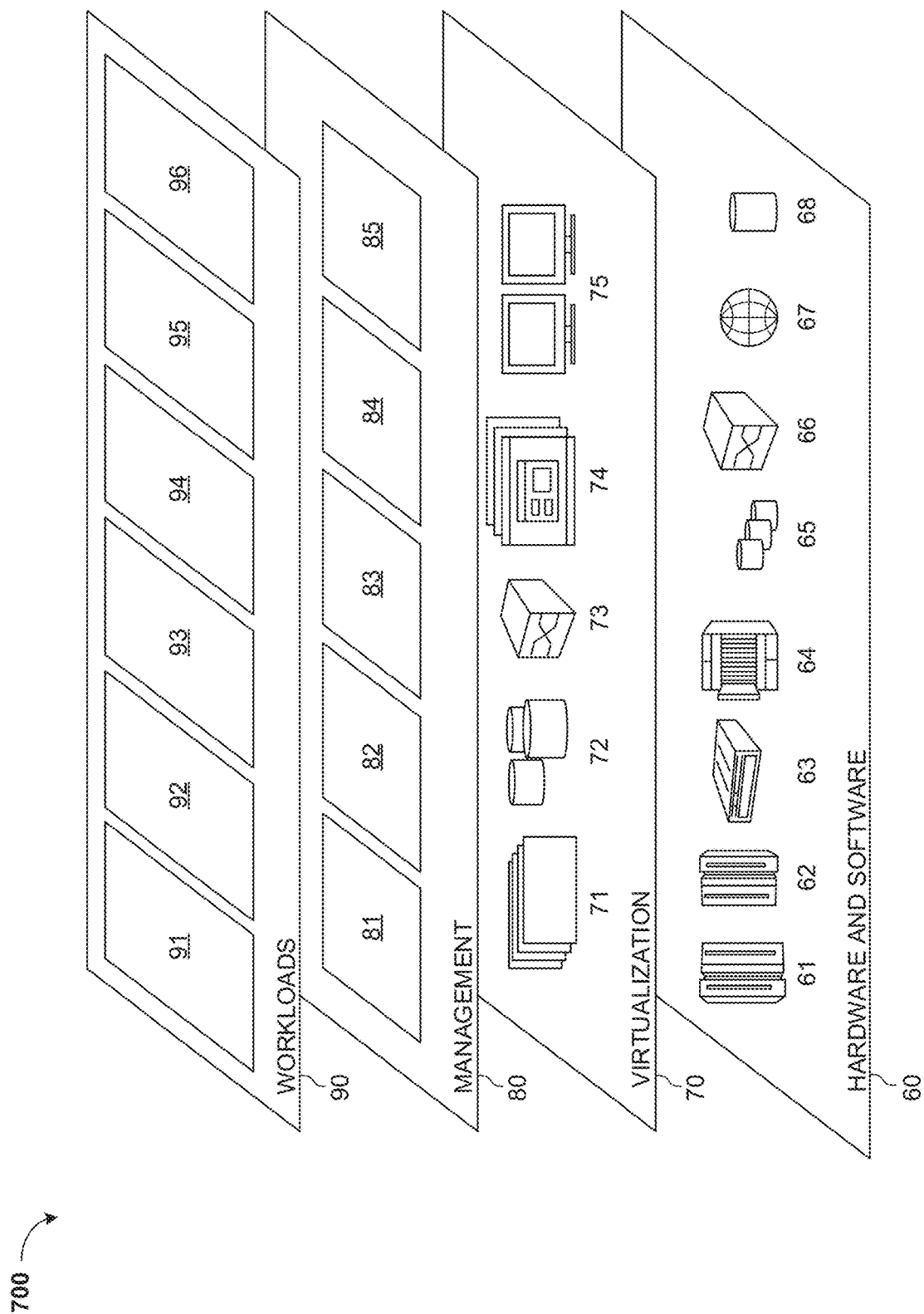
FIG. 7 is a block diagram of functional layers of the illustrative cloud computing environment of FIG. 6, according to at least one embodiment.

Referring to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Point Cloud Coding 96. Point Cloud Coding 96 may reduce a size of an array corresponding to syntax elements for predictive tree-based coding of point cloud data.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of encoding point cloud data, executable by a processor, comprising:
   receiving data corresponding to a point cloud;
   determining a number of contexts associated with the received data based on reducing a size of a context array corresponding to syntax elements for predictive tree-based coding of the point cloud, wherein the context array is a three-dimensional array that indicates a total number of contexts required to decode the syntax elements associated with the received data, wherein the reducing comprises reducing a size of at least one dimension of the context array from a first value to a second value less than the first value; and encoding the received data corresponding to the point cloud based on the reduced number of contexts.

2. The method of claim 1, wherein the size of the context array is reduced based on reducing a number of possible bit values for the contexts.

3. The method of claim 1, wherein a current node associated with the point cloud includes three geometry position residual components.

4. The method of claim 3, wherein the size of the context array is reduced based on the three geometry position residual components sharing the same contexts.

5. The method of claim 1, wherein the size of the context array is reduced based on reducing a number of possible indices for the contexts.

6. The method of claim 1, wherein the received data is encoded based on using a predictive tree to encode a largest coding unit.

7. The method of claim 6, further comprising encoding a number of points in the largest coding unit through predictive-tree based coding based on treating the largest coding unit as a smaller point cloud.

8. A computer system for decoding point cloud data, the computer system comprising:
one or more computer-readable non-transitory storage media configured to store computer program code; and
one or more computer processors configured to access said computer program code and operate as instructed by said computer program code, said computer program code including:
receiving code configured to cause the one or more computer processors to receive data corresponding to a point cloud;
determining code configured to cause the one or more computer processors to reduce a number of contexts associated with the received data based on reducing a size of an context array corresponding to syntax elements for predictive tree-based coding of the point cloud,
wherein the context array is a three-dimensional array that indicates a total number of contexts required to decode the syntax elements associated with the received data,
wherein the reducing comprises reducing a size of at least one dimension of the context array from a first value to a second value less than the first value; and
first encoding code configured to cause the one or more computer processors to decode the received data corresponding to the point cloud based on the reduced number of contexts.

9. The computer system of claim 8, wherein the size of the context array is reduced based on reducing a number of possible bit values for the contexts.

10. The computer system of claim 8, wherein a current node associated with the point cloud includes three geometry position residual components.

11. The computer system of claim 10, wherein the size of the context array is reduced based on the three geometry position residual components sharing the same contexts.

12. The computer system of claim 8, wherein the size of the context array is reduced based on reducing a number of possible indices for the contexts.

13. The computer system of claim 8, wherein the received data is encoded based on using a predictive tree to decode a largest coding unit associated with the point cloud.

14. The computer system of claim 13, further comprising second encoding code configured to cause the one or more computer processors to encode a number of points in the largest coding unit through predictive-tree based coding based on treating the largest coding unit as a smaller point cloud.

15. A non-transitory computer readable medium having stored thereon a computer program for encoding point cloud data, the computer program configured to cause one or more computer processors to:
receive data corresponding to a point cloud;
determine a number of contexts associated with the received data based on reducing a size of an context array corresponding to syntax elements for predictive tree-based coding of the point cloud,
wherein the context array is a three-dimensional array that indicates a total number of contexts required to decode the syntax elements associated with the received data,
wherein the reducing comprises reducing a size of at least one dimension of the context array from a first value to a second value less than the first value; and
encode the received data corresponding to the point cloud based on the reduced number of contexts.

16. The computer readable medium of claim 15, wherein the size of the context array is reduced based on reducing a number of possible bit values for the contexts.

17. The computer readable medium of claim 15, wherein a current node associated with the point cloud includes three geometry position residual components.

18. The computer readable medium of claim 17, wherein the size of the context array is reduced based on the three geometry position residual components sharing the same contexts.

19. The computer readable medium of claim 15, wherein the size of the context array is reduced based on reducing a number of possible indices for the contexts.

20. The computer readable medium of claim 15, wherein the received data is encoded based on using a predictive tree to decode a largest coding unit associated with the point cloud.

* * * * *